Figure 1:
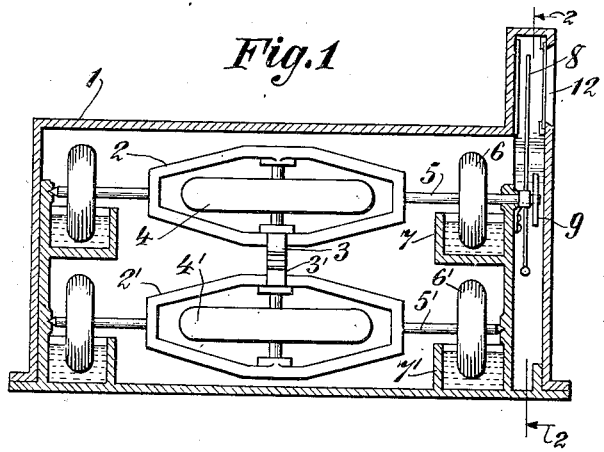

Aug. 14, 1934.  A. CHESSIN  1,969,965
GYROSCOPIC COMPASS AND LATITUDE INDICATOR

Filed May 1, 1926

INVENTOR:
Alexander Chessin

Patented Aug. 14, 1934

1,969,965

UNITED STATES PATENT OFFICE 1,969,965

GYROSCOPIC COMPASS AND LATITUDE INDICATOR

Alexander Chessin, New York, N. Y.

Application May 1, 1926, Serial No. 105,903

19 Claims. (Cl. 33—204)

My invention relates to gyroscopic devices designed for navigational purposes and operating both, as a compass and as a latitude indicator.

Gyroscopic compasses as constructed today suffer from several troublesome features of a more or less serious nature. It takes from four to six hours to set them, so that, should such an instrument get out of adjustment for any one of the numerous causes which are apt to throw it out of gear, it would leave the ship without guiding means for a period of many hours until the device has been set again, unless the ship is provided with a magnetic compass or other means for determining the bearing, as a safeguard. Another serious trouble to be dealt with in the gyro compasses of today is their erratic behaviour during heavy weather when the ship is on an intercardinal course. Not only does the compass become entirely unreliable in such a case, but, having gone off its true position, the trouble of setting it again is added to its uncontrollable behaviour. To these two causes of trouble, which are probably the most serious defects of the present day gyro compass, should be added a third which is due to the fact that the position of the gyroscope, when set, i. e. when pointing north and south, is one at which the directing force of the earth is nil, so that the gyroscope can not be closely held in this position but must continually oscillate about the meridian in order that a directing force may develop to send it back to the north and south position. This results in the so called "hunting" of the gyroscope, i. e. oscillations about the meridian which extend at least one half of a degree and usually as much as a full degree to either side of the meridian. Naturally, the indications of the instrument can not be more accurate than these oscillations permit them to be, i. e. the hunting error of one half of a degree to a full degree can not be avoided.

My device does away with all of the above enumerated defects. The indications are immediate and the instrument may be set anywhere and at any time in a few minutes. It can not run wild when the ship is on an intercardinal course, nor at any other time. It is always in a position where the maximum directing force of the earth is in operation and, therefore, its indications are as accurate as the skill of the builder of the instrument can make it. There is no hunting error. In addition, my device indicates not only the bearing of the ship at any moment, but also the latitude of the ship's position with great accuracy.

I accomplish these results by a novel way of utilizing the directing force of the earth's rotation on a gyroscope. Heretofore, indicating devices were designed to depend on the precession of the gyroscope, i. e. on the result or consequence of the existence of a directing force. The indications of my device are a direct measure of the force itself. Where others measure the results, I measure the cause of these results. As time has to elapse before the result of the directing force of the earth can be estimated, while the measurement of the force itself involves no time element whatsoever, the indications in apparatus depending on the precession of the gyroscope are very slow, while those in my device are immediate. This obvious deduction appears to have escaped the notice of prior investigators and inventors. It forms the basis of my present invention and of the one described in my copending application, Serial No. 401,810, filed August 6, 1920, which, in a sense, is a reciprocal of the present one.

Everything on the surface of the earth or in its atmosphere participates in the rotation of the earth around its axis. In accordance with the practice which I have followed throughout many years of teaching the art, this participating motion is here referred to as "convective motion", and the speed with which a body participates in this motion, its "convective speed". The convective speed is from west to east. It is maximum at the equator and zero at the poles of the earth. At any other latitude, it is proportional to the cosine of the latitude. If we denote the radius of the earth by R, and the angular velocity of the earth's rotation by $\omega$, then the convective speed at a latitude $\lambda$ is equal to $R\omega \cos \lambda$.

Convective speed may be decomposed into component parts or projected on a direction. Thus, we may speak of the convective speed of a moving body along the direction of its movement, meaning the projection of the convective speed on this direction. Therefore, if we denote by $\theta$ the angle which the direction of the moving body makes with the north and south line, and by U the convective speed in the direction of its motion, (1) $\qquad U = R\omega \cos \lambda \sin \theta$ For a given latitude, the knowledge of the angle $\theta$, i. e. the bearing angle, will enable us to determine the convective speed of the body in a fixed direction, and, conversely, the knowledge of the convective speed in a fixed direction will give us the bearing of the moving body. True, Formula (1) gives two solutions for the angle, namely $\theta$ and $180° - \theta$, but the general direction of movement, i. e. whether northerly or southerly, may be assumed in this case, thus making it obvious which one of the two solutions is the right one. It should be noted that in practice two units are to be used, as later explained, from which not only the sin, but the cos also is determined, thereby definitely fixing the value of the angle.

In my application, Serial No. 401,810, above referred to, I have shown how to utilize the first one of the above mentioned determinations to obtain the convective speed of a body from a given bearing. In the present invention, the case is reversed, and I utilize the knowledge of the convective speed to determine the bearing of the body.

The speed of a body moving relatively to the earth is called its "ground speed". This term originated in aeronautics, but it is used here without distinguishing between marine vessels and air ships. Like the convective speed, the ground speed may be decomposed into its elements along two or more directions. Thus, I may refer to the ground speed in the fore and aft line of a ship, meaning the component of ground speed along this direction. The ground speed in the direction athwartship is usually referred to as the "drift" of the ship.

The geometric sum of the convective speed and the ground speed constitutes what is termed the "absolute speed" of the body. This use of the word "absolute" is not strictly correct, since the body participates not only in the rotation of the earth about its axis, but also in the motion of the earth around the sun and in the motion of the entire planetary system. However, in view of the comparatively very slow angular motions around the sun and with the sun, these may be disregarded in the application of devices such as are here considered. Likewise, although the fundamental principle of the permanence of the axis of spin of a free gyroscope applies, strictly speaking, only to the conception of an absolute space, a conception not capable of actual realization, the effect of the slow motions around and with the sun on the gyroscope may be neglected for all practical purposes.

When a gyroscope is mounted on a body moving on the surface of the earth in such a manner that its axis of spin is compelled to remain horizontal, the effect is the same as if the axis of spin were made to rotate about the center of the earth. The absolute angular velocity of this rotation, the term "absolute" being used in the sense above defined and qualified, is equal to the absolute speed of the moving body divided by its distance from the center of the earth. If we denote this distance by D, the absolute speed of the body by V, and the absolute angular velocity of the body about the center of the earth by $\Omega$, we will have the relation (2) $$\Omega = \frac{V}{D}$$

Now, when the axis of spin of the gyroscope is rotated about a second axis making an angle $\alpha$ therewith, with an angular velocity $\Omega$, the gyroscope develops a torque, T, which is equal to the product of the moment of inertia of the gyroscope, G, the angular velocity of spin, N, the angular velocity $\Omega$, and the sine of the angle $\alpha$, so that (3) $$T = GN\Omega \sin \alpha = GN\frac{V}{D} \sin \alpha$$

Owing to the enormous length of the radius of the earth as compared to any variation in the height of the moving body over the surface of the earth (in the case of an airship), we may take D equal to R, the radius of the earth, so that the last formula becomes (4) $$T = GN\frac{V}{R} \sin \alpha$$

Assuming that the velocity of spin, N, is constant and that the angle $\alpha$ has a known fixed value, it will be seen that the torque is proportional to the absolute speed of the body, i. e.

(5) $$T = kV$$

where $k$ is a constant.

Thus, if we devise means for measuring the torque T, we have a direct measure of the absolute speed V of the moving body. This is the principle embodied in the device which I described in my copending application, Serial No. 401,810, referred to above. The convective speed being obtained there, as already mentioned, from the knowledge of the bearing of the moving body, ground speed is readily derived by subtracting the convective speed from the absolute speed, or by compensating the torque measurement for that part which is due to the convective speed. In the present case, I compensate the torque measurement for that part which is due to the ground speed. I thus obtain the convective speed of the body, which gives me the unknown bearing. In the case of a marine vessel, the ground speed is always known, so that my device is applicable to navigation on the seas without reservation. In the case of an airship, the present method is only applicable when the ground speed is known or can be determined.

A single unit comprising my device will determine the convective speed of the ship or other moving body only in one direction. The preferred method is to set the instrument for determination of the convective speed in the fore and aft direction. Formula (1) shows that, in order to derive the angle $\theta$, or bearing angle, from the value of U (convective speed in the fore and aft direction), it is necessary to know the latitude of the ship's position. When this latitude is not known, I use two units, one for the determination of the convective speed in the fore and aft direction, and a second one for the determination of the convective speed athwartship. Denoting the convective speed in the latter direction by U', we will have (6) $$U' = R\omega \cos \lambda \cos \theta$$

Given the values of U and U', both the bearing angle $\theta$ and the latitude of the place are determined by Formulæ (1) and (6) and are readily obtained in my device, as will be shown later.

Figure 2:
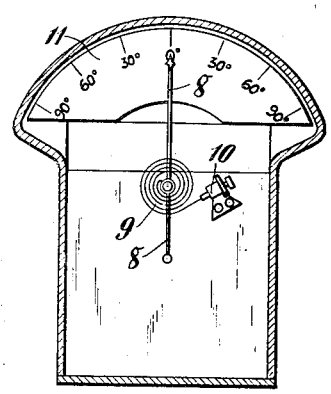
Figure 3:
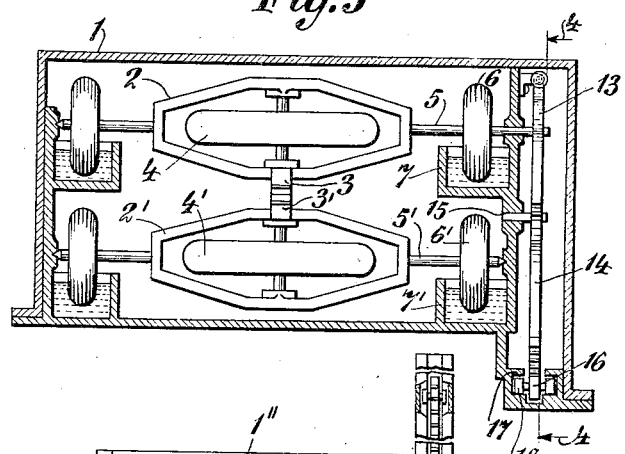
Figure 4:
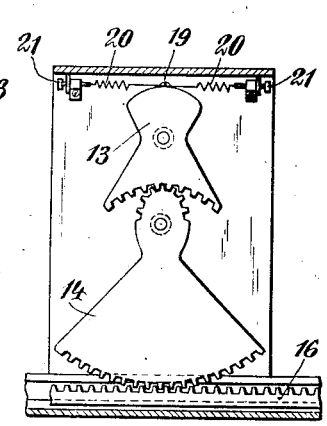
Figure 5:
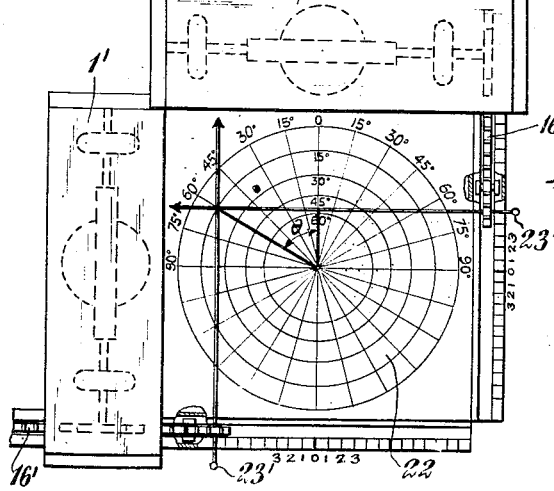
Figure 6:
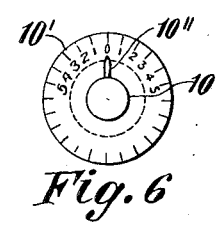

Referring to the drawing, Figure 1 is a front elevation of one form of my device wherein I employ two co-operating gyroscopes, the containing box therefor being drawn in cross section to show the working mechanism. Figure 2 is a view of the spring mechanism, indicator needle and chart, in the cross sectional plane 2—2 of Figure 1. Figure 3 is a front elevation of the preferred form of my invention, the casing being again in cross section, as in Figure 1. Figure 4 is a cross section taken along the line 4—4 of Figure 3. Figure 5 is a top view of a complete double unit embodying my invention and comprising two devices such as are shown in Figures 3, 4, at right angles to one another, together with indicators and a chart for the determination of the bearing of the ship and the latitude of its position. Figure 6 is a detail.

Taking up, first, the form of my invention illustrated in Figures 1 and 2, 1 is the casing which contains the operating mechanism and gyroscopes; 2 and 2' are frames pivoted in the casing 1; 3 and 3' are toothed sectors attached to the corresponding frames 2 and 2' and meshing with one another, thereby forming a coupling of the two frames 2, 2', which causes these frames to rotate in opposite directions, a form of coupling well known in the art; 4 and 4' are gyroscopes pivoted in the frames 2 and 2' and spinning in opposite directions. The means for spinning the gyroscopes are not shown, in order not to complicate the drawing. The axles 5 and 5' of the frames 2 and 2' are supported by floats 6 and 6' immersed in a buoyant liquid contained in the receptacles 7, 7', carried by the casing 1, for relieving the bearing friction of the axles 5, 5'. To the axle 5 is attached the indicating needle 8, the rotation of the axle and of the needle taking place against the spring 9 whose tension is regulated by the adjusting screw 10. This screw is calibrated and graduated for variations in tension, as is shown in the detail drawing, Figure 6, a dial 10' and an index member 10'' being provided to set the screw for any given tension, the calibrations being made in accordance with standard practice. A scale 11 is mounted on the casing 1, and a window 12, opposite the scale, permits one to read the indications of the needle 8 on the scale 11.

The scale 11 is constructed as follows. Let $\gamma$ be the angle which the needle 8 makes with the vertical, or zero reading, at the moment when the torque T of the gyroscope is equal to the tension S of the spring 9, this tension S being adjusted to compensate for the ground speed of the ship, as will be later explained, then, by Formulæ (1) and (4), in which U has been substituted for V, since the effect of the ground speed has been eliminated by the aforesaid adjustment of the tension S, and the angle $90°-\gamma$ has been substituted for the angle $\alpha$, (7) $\quad T = GN \dfrac{U}{R} \cos \gamma = GN\omega \cos \lambda \sin \theta \cos \gamma = S$ The tension S is a function of the angle $\gamma$ and may be represented, in general, by the formula $S = f(\gamma)$. In the application of this form of my invention, it is assumed that the latitude of the place is known. Assuming, furthermore, that this latitude is constant, for the present, and denoting the product of all the constants in the last formula by $1/k'$, Formula (7) yields the following relation between the angles $\theta$ and $\gamma$:

(8) $\quad \sin \theta = k' \dfrac{f(\gamma)}{\cos \gamma}$ or, in the simplest case, where the tension of the spring is so designed as to be proportional to the angle $\gamma$, (9) $\quad \sin \theta = k'' \dfrac{\gamma}{\cos \gamma}$ From Formulæ (8) and (9) a value of the bearing angle $\theta$ is obtained for every angle $\gamma$, and these values of $\theta$ are marked on the scale 11, i. e. the needle indicates not the angle $\gamma$ which it makes with the vertical, but the angle $\theta$ corresponding thereto. It will be seen, therefore, that the needle 8 indicates the bearing angle of the ship at any moment.

I will now explain how the tension of the spring 9 is adjusted to compensate for the effect of ground speed. Let W be the ground speed in the fore and aft direction of the ship, or what is ordinarily referred to simply as the speed of the ship, and let this ground speed produce a torque $T_o$ on the gyroscope, which is balanced by the tension $S_o$ of the spring 9 when the needle 8 is deflected by an angle $\delta$. Then

(10) $\quad T_o = GN \dfrac{W}{R} \cos \delta = S_o$

Taking $S_o = k_o \delta$, since the tension of the spring is proportional to the angle of deflection of the needle for very small angles no matter what the function $f(\gamma)$ may be, and substituting 1 for $\cos \delta$, which we may do because of the smallness of the angle $\delta$, Formula (10) gives

(11) $\quad \delta = \dfrac{GNW}{Rk_o}$

All the values on the right side of the last formula are known. Accordingly, to adjust the tension of the spring 9 in order to compensate for the ground speed of the body, the adjusting screw 10 is turned, in one direction, or in the opposite one, as the case may be (according as the course of the ship is easterly or westerly, and taking into account the sense of rotation of the gyro about their axes of spin), until the needle 8 is deflected by an angle $\delta$, as calculated from Formula (11). This adjustment is made, of course, while the gyroscopes are not spinning, as otherwise the needle 8 would be affected by the convective speed of the moving body.

Passing now to the preferred form of my invention, illustrated in Figures 3, 4 and 5, the numerals 1 to 7 designate the same elements as in Figures 1 and 2. Instead of the indicating needle 8, we have now a gear 13 fixed to the axle 5 of the frame 2. A second gear, 14, is pivoted in the casing 1 at 15. The gear 14 engages a rack 16 which is adapted to slide in the groove 17 on rollers 18. At the center 19 of its upper boundary, the gear 13 is held in position by two springs 20 which are adjustable in tension by means of calibrated and graduated screws 21. The gears 13 and 14 mesh along unconventional pitch lines the forms of which will be discussed later. In Figure 5, 1' and 1'' are casings of two instruments similar to the one shown in Figures 3 and 4. They are disposed at a right angle to one another and between them is set up a chart 22 which comprises concentric circles and radial lines, graduated in degrees, as shown. The two racks, 16' and 16'', carry indicators 23' and 23'' which intersect at a point shown in the drawing to fall on the radial line 60° and circle 15°. As will be explained later, this means that the bearing angle is east 60° and the latitude of the ship's position is 15°.

The gears 13 and 14 are designed as follows. Let the tension of the springs 20, adjusted to compensate for the ground speed of the ship in the fore and aft direction, i. e. for the "speed of the ship" as the term is ordinarily used, be again designated by S, and let S, as before, be given by the formula $S = f(\gamma)$, $\gamma$ being the angle by which the gear 13 is turned when the gyroscopic torque T is balanced by the spring tension S. When the gear 13 turns by an angle $\gamma$, the gear 14 turns by an angle $\epsilon$. The pitch lines of the two gears 13, 14, where they mesh, are so designed that $$\epsilon = \dfrac{f(\gamma)}{\cos \gamma}$$

The adjustment of the springs in the preferred form of my invention is made in the same manner as explained for the case of the instrument shown in Figures 1, 2, the compensation being for the ground speed of the ship in the fore and aft direction in one of the two instruments, and for the drift in the other instrument. In the application of my invention to marine ships, as a rule, no adjustment for drift is required, the drift being negligible, just as in the gyro compass no corrections are made for drift. When used in connection with air ships, however, the drift may be considerable and compensation must be made, as described above.

I will now briefly explain the operation of the preferred form of my invention.

We have, as before, $$T = GN \frac{U}{R} \cos \gamma = S = f(\gamma)$$

and, therefore,

(12) $$U = \frac{R}{GN} \frac{f(\gamma)}{\cos \gamma}$$

In the drawing, it has been assumed that $f(\gamma) = k\gamma$, i. e. that the tension of the spring is proportional to the deflection of the gear 13, so that Formula (12) becomes

(13) $$U = \frac{R}{GN} \frac{k\gamma}{\cos \gamma}$$

The linear displacement, D, of the rack 16 is equal to $\rho\epsilon$, where $\rho$ is the radius of the lower sector of the gear 14. Hence,

(14) $$D = \rho\epsilon = \rho \frac{k\gamma}{\cos \gamma} = \rho \frac{GN}{R} U = CU$$

where C is a constant and equal to $$\rho \frac{GN}{R},$$

i. e. the linear displacement of the rack is proportional to the convective speed in the direction for which the instrument is set. In Figure 5, wherein one instrument, namely the one in the casing 1', is so disposed as to determine the convective speed in the fore and aft direction, and the other instrument, in the casing 1'', is set up to determine the convective speed athwartship (the drift), the displacements D' and D'' of the corresponding racks 16' and 16'' will give the two components of the convective speed, one in the fore and aft direction and the other athwartship, namely,

(15) $\quad D' = CU = CR \, \omega \, \cos \lambda \, \sin \theta$

(16) $\quad D'' = CU' = CR \, \omega \, \cos \lambda \, \cos \theta$

The resultant gives the convective speed and is proportional to the cosine of the latitude of the place of observation. The concentric circles in the chart 22 are drawn at distances from the center proportional to $\cos \lambda$ for different values of $\lambda$. It will be seen, therefore, that the line from the center of the chart 22 to the intersection of the indicators 23' and 23'', always points to the true north, that the radial scale mark of this line gives the exact bearing angle, and that the marking on the circle on which the indicators intersect gives the exact latitude of the place of observation. In the drawing, the bearing angle, $\theta$, is shown to be 60° east, and the latitude of the ship's position 15°.

When the latitude of the place is known, a single instrument, such as shown in Figures 3, 4, in conjunction with the chart 22, may be used, as well as the single instrument of the form illustrated in Figures 1, 2. In such an application of my invention, the bearing is given on the chart 22 by the intersection of the indicator 23 with the circle corresponding to the known latitude. Here, as in all cases where a single instrument is used in lieu of the double unit apparatus, the general direction of the course, i. e. northerly or southerly, easterly or westerly, is assumed, so that there is no difficulty in selecting the right one of two possible solutions of the problem, as, in the present instance, the selection of the right one of the two intersections of the indicator with the latitude circle.

In explaining the construction of the scale 11, Figure 2, it was assumed that the latitude remained constant during the operation. As a matter of practice, many courses are pursued by both marine and air ships which remain within practically the same latitude. A change of latitude not exceeding five degrees will not affect the reading of the instrument to an appreciable extent. When the instrument illustrated in Figures 1, 2, is used and operation is desired for substantial changes of latitude, additional scales are furnished, the chart comprising in this case a series of graduated concentric arcs, similar to the one shown in Figure 2 as the scale 11. These additional scales are constructed by means of the same Formula (8) or (9), except that the values of the coefficients $k'$ and $k''$ are calculated for a series of different values of the latitude. A chart designed to give indications for various latitudes, instead of being limited to a single latitude, is shown in my application, Serial No. 401,810, several times referred to in the present specification. The latitude of the ship's position being known, the indication of the needle 8 is read on the scale corresponding to this particular latitude.

The double unit device illustrated in Figure 5 may also be used to determine the drift of the ship when the latitude is known. In this case, the instrument in the casing 1'', set athwartship, is without correction for drift. The difference between the actual displacement of the indicator 23'' and the correct displacement, as determined by the intersection of the indicator 23' with the circle corresponding to the known latitude, gives the value of the drift.

In a similar manner, when the latitude is known and the drift also is given, the "speed of the ship", i. e. its ground speed in the fore and aft direction, is determined by the difference between the actual displacement of the indicator 23' and the correct displacement as defined by the intersection of the indicator 23'' with the latitude circle, the instrument in casing 1' being without correction for ground speed in this case.

Finally, when both the latitude and the bearing are known, the "speed of the ship" and the drift are given by the differences between the actual displacements of the two indicators and the correct displacements as determined by the latitude circle and bearing angle. Furthermore, the distance between the point of intersection of the latitude circle and radial line corresponding to the given bearing, and the point of intersection of the two indicators 23' and 23'', is a direct measure of the actual ground speed, and the direction of the aforesaid distance is the actual direction of movement relatively to the earth.

The gear and rack mechanism in the preferred form of my invention may be so designed that the racks will be near the top of the casing, instead of near the bottom, for instance, by connecting the axle 5', instead of the axle 5, with the gear 13 and turning the entire gear and rack mechanism by 180 degrees. Then the chart 22 may be set up on top of the casings 1′, 1″, instead of between them. In the practical application of my invention, I prefer to replace the indicator 23 by a hair line stretched across the chart between two parallel racks moving in unison, so as to enable me to secure a sharper and more accurate reading of the scale 22. The arrangement of a single rack for each instrument has been selected here only in order to simplify the drawing. Any one skilled in the art would know how to modify the mechanism in accordance with the above brief description. Likewise, the general disposition of the two instruments and of the chart, as shown on the drawing, is not the most economical, as far as space is considered, and has been adopted merely for the sake of clearness in illustrating the operation of my device.

The axes of spin of the gyroscopes are shown in the drawing as vertical, but I am not restricted to this arrangement. I may, for instance have the axes of spin horizontal and the frames 2, 2′ revoluble about vertical axes, a modification shown in my patent 1,933,493, Oct. 31, 1933, for a device of similar nature. When such an arrangement is adopted, the gears 13 and 14 turn in a horizontal plane.

The casing 1 may be either suspended in gimbals or placed on a stabilized table. Neither the gimbals nor the stabilized table are shown in the drawing because such means for mounting an apparatus are old and well understood in the art. It is well to note, however, that the operation of my device is not affected by oscillations or turning movements except about one axis, having in mind a single instrument of the form shown in Figures 1, 2, or 3, 4, so that stabilization, when desired (it will be shown presently that it is not always necessary), needs to be accomplished only about this one axis to eliminate the effect of yawing, rolling and pitching of the ship on which the apparatus is mounted. Consider, for example, the apparatus 1′ in Figure 5. The axle 5 is fore and aft. A rolling motion of the ship may produce an oscillation of the apparatus about an axis parallel to the axle 5. Such an oscillation is not resisted by the two gyroscopes which will participate in the motion of the apparatus as a whole, so that no tension is produced thereby on the springs which actuate the indicator and the indications of the instrument remain unaffected. A yawing motion of the ship affects one of the two gyroscopes 4, 4′, in a way tending to increase the angle $\gamma$, and the other gyroscope in exactly the opposite way, so that the combined effect on the two gyroscopes, owing to their peculiar coupling, is nil, and the instrument readings remain undisturbed. Therefore, neither the rolling nor the yawing of the ship can affect the apparatus when set, as assumed, fore and aft. Only pitching of the ship may cause a disturbing effect on the indications of the instrument. By stabilizing the instrument mounting about the axis of pitching, i. e. about an axis athwartship, the effect of pitching will also be eliminated. However, such stabilization is not always necessary. Pitching is a periodic motion so that its effect on the instrument is to cause the indicator to oscillate back and forth about a position of equilibrium. A practised eye will easily detect the amplitude of such oscillations and be able to estimate the position of equilibrium of the indicating needle with sufficient accuracy for all practical purposes.

Next, consider the apparatus 1″ in Figure 5. The axle 5 is now athwartship. Reasoning as above, it will be seen that neither pitching, nor yawing, will affect the readings on this instrument. It will, however, be susceptible to rolling motion. The latter effect may be eliminated by stabilizing the instrument about an axis fore and aft. This stabilization, also, may be omitted for reasons explained in connection with pitching.

When two instruments are used, as illustrated in Figure 5, and stabilization is desired, both gimbal rings, or the supporting table, are stabilized in a manner best suited for the purpose and presenting no novelty. Stabilization may, for instance, be effected by a single gyroscopic pendulum of a sufficiently long arm, or by a system of gyroscopes operating on two axes perpendicular to one another.

It will also be clear from the foregoing discussion that an instrument set fore and aft is not affected by centrifugal forces acting in a plane athwartship, since the effect of such forces is to turn the instrument about an axis directed fore and aft, i. e. the effect is similar to that of rolling. Therefore, in navigating the seas, an instrument so disposed is not affected by any change in the course of the ship, nor, in navigating the air, by following a horizontal curve and banking in compliance therewith.

In explaining how the adjusting screw 10, Figure 2, is used to vary the tension of the spring 9, it was shown that this screw is turned until the needle 8 is deflected by an angle $\rho$, the value of which is given by Formula (11). This angle $\rho$ corresponds to the ground speed W. The graduation on the dial 10′, Figure 6, is made in terms of W, so that, to make the desired adjustment, it is only necessary to set the index member 10″ for the given value of W, i. e. for the known "speed of the ship".

The chart 22 may be provided also with scales along its edges on which the distances of the indicators 23′ and 23″ from the center of the chart or from their middle positions may be read as is indicated by the numerals 1, 2, 3, etc. along the edges of Figure 5, the numerals progressing from the zero points in opposite directions and indicating positive or negative values of U and U′. Such scales would allow the values of U and U′ to be read off directly from the scales. Usually, only determinations of the bearing angle and of the latitude are of interest, and, for this reason, the U-scales may be omitted from the chart 22 in Figure 5. The U-scales may be added for instance, when the device is to be used for the determination of the ship's speed (in the ordinary sense of the word) and drift by comparing the actual positions of the indicators 23′ and 23″ with their correct positions, as defined by the known bearing and latitude, and the two instruments 1′ and 1″ are not corrected for the ground speed, a method of operation which has been duly set forth above.

My invention is also adapted to various uses when set up on a stationary body. In such applications of my device, no correction is required to compensate for the ground speed, as in the case where the apparatus is mounted on a moving body. Thus, when the latitude of the place is known, the direction of the true north and the meridian of the place may be determined in the manner described above, with a single instrument of either one of the two forms shown in the drawing. By using two instruments, as illustrated in Figure 5, both, the meridian and the latitude of the place may be determined in the manner described and explained above.

Nor is it necessary that the two instruments be set up at a right angle to one another, since speed may be decomposed into its elements along any two intersecting lines, and, conversely, speed components along any two intersecting lines will form a parallelogram whose diagonal represents the resultant speed. The only difference, when the two instruments are disposed at an angle $\mu$ which is not a right angle will be that the values of U and U' in such a case will be the components of the convective speed along the lines forming the angle $\mu$, instead of its projections on two perpendicular lines. Naturally, this new disposition of the instruments requires various changes in the apparatus as a whole, but such changes are well within the knowledge of those skilled in the art and it is deemed to be unnecessary to further enlarge this specification by going into the details of such a modified construction. The foregoing observation and remarks apply with equal force to the case of a moving body, although, on a ship, it will be found more convenient to set up one instrument in the fore and aft direction and the other one athwartship, as was assumed in the case of Figure 5.

The two gyroscopes 4 and 4' need not be placed one above the other, as in the drawing. They may be so disposed that the axes 5 and 5' are in the same plane passing through a predetermined horizontal line, in general, i. e. the two axes 5 and 5' may be in different vertical planes. For instance, these axes may lie in a horizontal plane, so that the two gyroscopes are arranged side by side. Likewise, when the frames 2 and 2' are pivoted to turn about a vertical axis, the two gyroscopes may be above one another or side by side. In all cases, however, the gyroscopes must be coupled for opposite precession and spin in opposite directions.

When the apparatus is not subject to oscillations or the action of centrifugal forces, as when it is mounted on a stationary body, a single gyroscope will perform the function of the two gyroscopes of Fig. 1 or Fig. 3, and therefore in such cases the gyroscope 4' may be omitted.

I claim:

1. The combination with a gyroscope mounted on a body with its axis of spin revoluble about a second axis in a predetermined vertical plane, of means responsive to the torques of said gyroscope about said second axis, a device responsive to said means and a scale graduated in terms of bearing angles cooperating with said device for indicating the bearing of said plane.

2. The combination with a gyroscope mounted on a body with its axis of spin revoluble about a horizontal axis, of means responsive to the torques of said gyroscope about said horizontal axis, a device responsive to said means and a scale graduated in terms of bearing angles cooperating with said device for indicating the bearing of said horizontal axis.

3. The combination with a gyroscope mounted on a moving body to develop a torque as said body is carried around the center of the earth, of means for exerting a counter-torque to said torque, a device responsive to said means including a scale calibrated in units of bearing angles, for indicating the bearing of said moving body, and means for adjusting said counter-torque to eliminate the effect of ground speed from the indications of said device.

4. The combination with two gyroscopes mounted on a body with their axes of spin revoluble about two precession axes respectively lying in intersecting vertical planes, means responsive to the torques developed by said gyroscopes about said precession axes, as said body is carried around the center of the earth, and a device jointly actuated by said respective means for indicating the meridian and the latitude of said body.

5. The combination with two gyroscopes mounted on a body with their axes of spin revoluble about horizontal axes at an angle to one another, of means responsive to the torques respectively developed by said gyroscopes about said horizontal axes, as said body is carried around the center of the earth, and a device jointly actuated by said respective means for indicating the meridian and the latitude of said body.

6. The combination with a gyroscope mounted on a moving body to develop a torque as said body is carried around the center of the earth, of means for exerting a counter-torque to said torque, means for adjusting said counter-torque to compensate for the ground speed of said moving body, and means for indicating the bearing of said body when said counter-torque balances the gyroscopic torque.

7. The combination with a gyroscope with its axis of spin revoluble about a second axis and adapted to develop a torque about said second axis, of means for exerting a counter-torque to said torque, means for transforming angular movement of said gyroscope about said second axis into a translatory movement, and indicating means displaced by said transforming means, the displacement in said translatory movement being proportional to said counter-torque divided by the cosine of the angle of said angular movement.

8. The combination with a gyroscope mounted on a moving body, with its axis of spin revoluble about a horizontal axis perpendicular thereto and adapted to develop a torque about said horizontal axis as the body moves, of means for exerting a counter-torque to said torque, means for adjusting said counter-torque to compensate for the ground speed of said moving body, means for transforming angular movement about said horizontal axis into a translatory movement, and indicating means displaced by said transforming means, the displacement in said translatory movement being proportional to said counter-torque divided by the cosine of the angle of said angular movement.

9. An instrument comprising a casing, a couple of frames mounted in said casing for rotation on parallel axles and coupled for opposite rotation, a gyroscope pivoted in each frame to spin about an axis at a right angle to said axles, means for relieving the bearing friction of said axles, a gear mounted on one of said axles and revoluble therewith, means for resisting the rotation of said gear, a rack adapted to freely move in a horizontal plane at a right angle to said axles, a second gear pivoted in said casing and meshing on one side with said first mentioned gear and on the other with said rack, the angular deflection of said second gear being proportional to the torque of said resisting means divided by the cosine of the angle of deflection of said first mentioned gear, and an indicator on said rack at a right angle thereto.

10. An apparatus comprising two instruments as in claim 9 with the set of parallel axles of each casing at a right angle to one another, and a chart over which the indicators of said two instruments are adapted to travel, said chart comprising radial lines at fixed angular intervals and concentric circles whose radii are proportional to the cosine of an angle ranging from zero to ninety degrees.

11. An instrument comprising a casing, a frame mounted in said casing for rotation on a horizontal axle, a gyroscope pivoted in said frame at a right angle to said axle, a gear mounted on said axle and revoluble therewith, a spring adapted to resist rotation of said gear, means for adjusting the tension of said spring, a rack adapted to freely slide in a horizontal plane at a right angle to said axle, a second gear pivoted in said casing and meshing on one side with said first mentioned gear and on the other with said rack, the angular deflection of said second gear being proportional to the tension of said spring divided by the cosine of the angle of deflection of said first gear, and means for indicating the change in position of said rack.

12. The combination of a plurality of gyroscopes for use on a craft, means mounting each gyroscope for rotation about a precession axis perpendicular to its axis of spin, whereby each may develop a torque about its respective precession axis as the craft moves about the center of the earth, means for exerting counter-torques to said torques, indicating means actuated by said gyroscopes, a chart over which said indicating means operate to indicate bearings of said craft and its latitude, and means for adjusting said counter-torque exerting means to eliminate the effect of ground speed on said gyroscopes.

13. The combination of two gyroscopes for use on a craft, means mounting each gyroscope for rotation about a precession axis perpendicular to its axis of spin, said precession axis being horizontal and mutually perpendicular, whereby each gyroscope may develop a torque about said precession axis as the craft moves about the center of the earth, means for exerting counter-torques to said torques, co-operating indicating means actuated by said gyroscopes, a chart over which said indicating means operate to indicate bearings of said craft and its latitude, and means for adjusting said counter-torque exerting means to eliminate the effect of ground speed on said gyroscopes.

14. The combination of a pair of gyroscopes spinning in opposite directions and coupled for opposite precession, means mounting said gyroscopes on a craft to develop torques about the axes of precession in response to movement of said craft about the center of the earth, means responsive to the torques developed by said gyroscopes, means for eliminating the effect of the torque induced by the ground speed of said craft, a device responsive to said torque responsive means for indicating the bearing of a vertical plane through one of said axes of precession, and a chart graduated in terms of bearing angles over which said device is movable.

15. The combination of two pairs of gyroscopes, the gyroscopes of each pair spinning in opposite directions and being coupled for opposite precessions, means mounting said gyroscopes on a craft to develop torques respectively about the axes of precession of each pair in response to movement of said craft about the center of the earth, means respectively responsive to the torques developed by each of said pairs of gyroscopes, means for eliminating the effect of the torques induced by the ground speed of said craft, a device responsive to said respective torque responsive means for jointly indicating the meridian and the latitude of said craft, and a chart graduated in terms of bearing angles and latitudes over which said device is movable.

16. The combination with a gyroscope mounted on a craft to develop a torque about an axis perpendicular to its axis of spin, of means for exerting a counter-torque to said torque, means to eliminate that portion of the torque which is induced by the ground speed of said craft, leaving a residual torque, a device responsive to said residual torque, and means graduated in terms of bearing angles with which said device co-operates for indicating the bearing of said perpendicular axis when said counter-torque balances the gyroscopic torque.

17. The combination with a gyroscope mounted on a craft to develop a torque about an axis having a predetermined direction, of means for exerting a counter-torque to said torque, means to eliminate that portion of the torque which is induced by the ground speed of said craft, leaving a residual torque, a device responsive to said residual torque, and means graduated in terms of bearing angles with which said device co-operates for indicating the bearing of said predetermined direction when said counter-torque balances the gyroscopic torque.

18. The combination with a gyroscope, of means mounting said gyroscope on a craft to develop a torque about an axis in response to movement of said craft about the center of the earth, means for exerting a counter-torque to said torque proportional to the angular deflection of said gyroscope about said axis, said means being initially adjusted to eliminate the effect on said gyroscope of the ground speed of said craft, and means for transforming the angular deflection caused by the portion of the torque not eliminated into a translatory movement, the displacement in said translatory movement being proportional to said angular deflection divided by the cosine thereof.

19. The combination with two gyroscopes mounted on a craft with the axes of spin revoluble about horizontal axes at an angle to one another, of means responsive to the torques respectively developed by said gyroscopes about said horizontal axes, as said craft is carried around the center of the earth, and a device jointly actuated by said respective means for indicating the meridian and the latitude of said body, including a chart comprising radial lines at fixed angular intervals and concentric circles whose radii are proportional to the cosine of an angle from zero to 90 degrees.

ALEXANDER CHESSIN.